United States Patent [19]

Nightingale

[11] Patent Number: 5,235,807
[45] Date of Patent: Aug. 17, 1993

[54] FLUID FLOW ARRANGEMENT
[75] Inventor: Douglas J. Nightingale, Jonesboro, Ga.
[73] Assignee: Rolls-Royce, Inc., Reston, Va.
[21] Appl. No.: 903,474
[22] Filed: Jun. 24, 1992
[51] Int. Cl.⁵ .............................. F02K 1/00
[52] U.S. Cl. ................. 60/229; 239/265.29; 239/265.31
[58] Field of Search ............... 60/228, 229, 230, 232, 60/226.2; 239/265.31, 265.29, 265.27; 77/97

[56] References Cited

U.S. PATENT DOCUMENTS 3,779,010 11/1973 Chamay ........................ 60/226.2

FOREIGN PATENT DOCUMENTS 2151157 10/1971 Fed. Rep. of Germany ..................... 239/265.31

Primary Examiner—Richard A. Bertsch
Assistant Examiner—W. J. Wicker
Attorney, Agent, or Firm—Oliff & Berridge

[57] ABSTRACT

A diverter valve arrangement for a fluid flow duct having selectively alternative outlets. In order to avoid an over-area condition during transition an additional valve is provided to delay the effect of operating the main changeover valve. The diverter valve comprises a sleeve valve which covers/uncovers side outlet ports in the duct wall and a blocker valve made up of a plurality of segments pivoted to the inside of the sleeve valve. As the sleeve translates to uncover the side ports the blocker valve leaves deploy to obstruct axial flow. The additional sleeve valve acts as a shuttle and temporarily follows the main sleeve to delay uncovering the side ports.

13 Claims, 6 Drawing Sheets

FLUID FLOW ARRANGEMENT

FIELD OF THE INVENTION

The invention concerns an arrangement for a fluid flow duct in which fluid flow is selectively directed to alternative outputs. In particular, the invention concerns an aircraft power plant especially a vectored lift engine of the kind for vertical take-off and landing (VTOL).

The invention especially relates to a power plant of the kind mentioned above further adapted to employ an axial discharge nozzle for forward propulsive thrust in the cruise mode and side discharge nozzles to provide vertical thrust for lift. The side discharge nozzles are vectorable between downward and rearward pointing positions for transition between jet-borne and wing-borne flight.

An engine of this type is described in U.S. Pat. No. 3,280,560. Essentially it is a by-pass type engine which has a conventional axial type discharge nozzle for normal forward propulsive thrust in wing-borne flight. For jet-borne flight the by-pass and exhaust flows are selectively diverted. The cold by-pass flow is discharged through a pair of forward mounted vectorable nozzles on port and starboard sides of the engine. The hot turbine exhaust is also blocked by a diverter valve, in this case of the "clamshell" type. The valve members divert the axial flow to discharge through rearward mounted, also port and starboard, vectorable nozzles. The clamshell valves each comprise a fragment of a cylinder with oblique upstream and downstream edges. The valve members are mounted on vertical trunnions so they can be swung between a first position in which each blocks a side exit aperture in the jet pipe wall and a second position in which they come together to block flow to the axial nozzle.

A drawback with this type of arrangement arises due to area mismatching. During transition between operating modes the total effective outlet area, immediately downstream of the turbine section, undergoes a substantial although temporary increase even if the jet pipe and side outlet areas are closely matched. This occurs as the clamshell valves begin to uncover the side outlets and to block the jet pipe. Unfortunately the initial effect of the latter is overwhelmed by initial effect of opening the side exits.

A different type of valve arrangement which may be adapted to divert gas flows is disclosed in U.S. Pat. No. 4,587,803. The engine described therein has a tandem fan arrangement with a changeover valve between the fans to selectively divert flow from the front fan either through an axial duct leading to the second fan or through side exits exhausting to atmosphere. A sleeve valve blocks or uncovers the side exits by moving axially. Pivoted to the sleeve valve are a plurality of valve segments which are restrained by a fixed length link thereby causing the segments to pivot inwardly to block the axial duct as the sleeve is translated rearwards. This arrangement may be adapted for hot exhaust gas flows by the use of suitable materials to construct the valve members described above.

The invention has for one of its objectives to provide a valve arrangement adapted for use in the above applications and in particular as an exhaust and diverter valve.

SUMMARY OF THE INVENTION

According to the invention in its broadest form there is provided a fluid flow duct arrangement comprising:
a generally cylindrical wall having an upstream end defining a flow entry, a downstream end defining a first flow exit, and formed between said upstream and downstream ends at least one side aperture defining a second flow exit;
first valve means disposed within the duct for selective deployment to obstruct the first flow exit;
axially translatable second valve means arranged for selective deployment to block or to uncover the side outlet means;
the first valve means and the second valve means being arranged for movement in synchronism to open and block said exits alternatively;
wherein the axially translatable second valve means comprises two independently movable parts which co-operate to uncover and block the side flow exit in a staged movement whereby to maintain substantially constant pressure in the duct.

Preferably the second valve means comprises an upstream sleeve valve member and a downstream sleeve valve member. In a first valve position a first of said two sleeve valve members is arranged to block the side flow exit, and in a second valve position neither of the two sleeve valve members obstructs the side flow exit. In intermediate valve positions moving from said first valve position to said second valve position the two axially movable sleeve valve members co-operate to delay opening of the side flow exit.

According to another aspect of the invention there is provided an aircraft power plant comprising:
a gas turbine engine;
a jet pipe for receiving exhaust gas from the engine;
axial discharge nozzle means at a downstream end of the jet pipe for discharging exhaust gas therefrom;
side outlet means towards an upstream end of the jet pipe communicating with alternative discharge nozzle means;
diverter valve means located adjacent the side outlet means to divert flow alternatively to the side outlet means or to the jet pipe;
first valve means disposed within the upstream end of the jet pipe for selective deployment to block exhaust flow through the jet pipe;
axially translatable second valve means arranged for selective deployment to block or uncover the side outlet means;
wherein the axially translatable second valve means comprises two independently movable parts which co-operate to uncover and block the side flow exit in a staged movement whereby to maintain pressure of the flow from the gas turbine engine substantially constant.

BRIEF DESCRIPTION OF THE DRAWINGS

These and further aspects of the invention will become clearer from the following description of the embodiments illustrated in the accompanying drawings, in which.

DETAILED DESCRIPTION OF THE INVENTION

Figure 1:
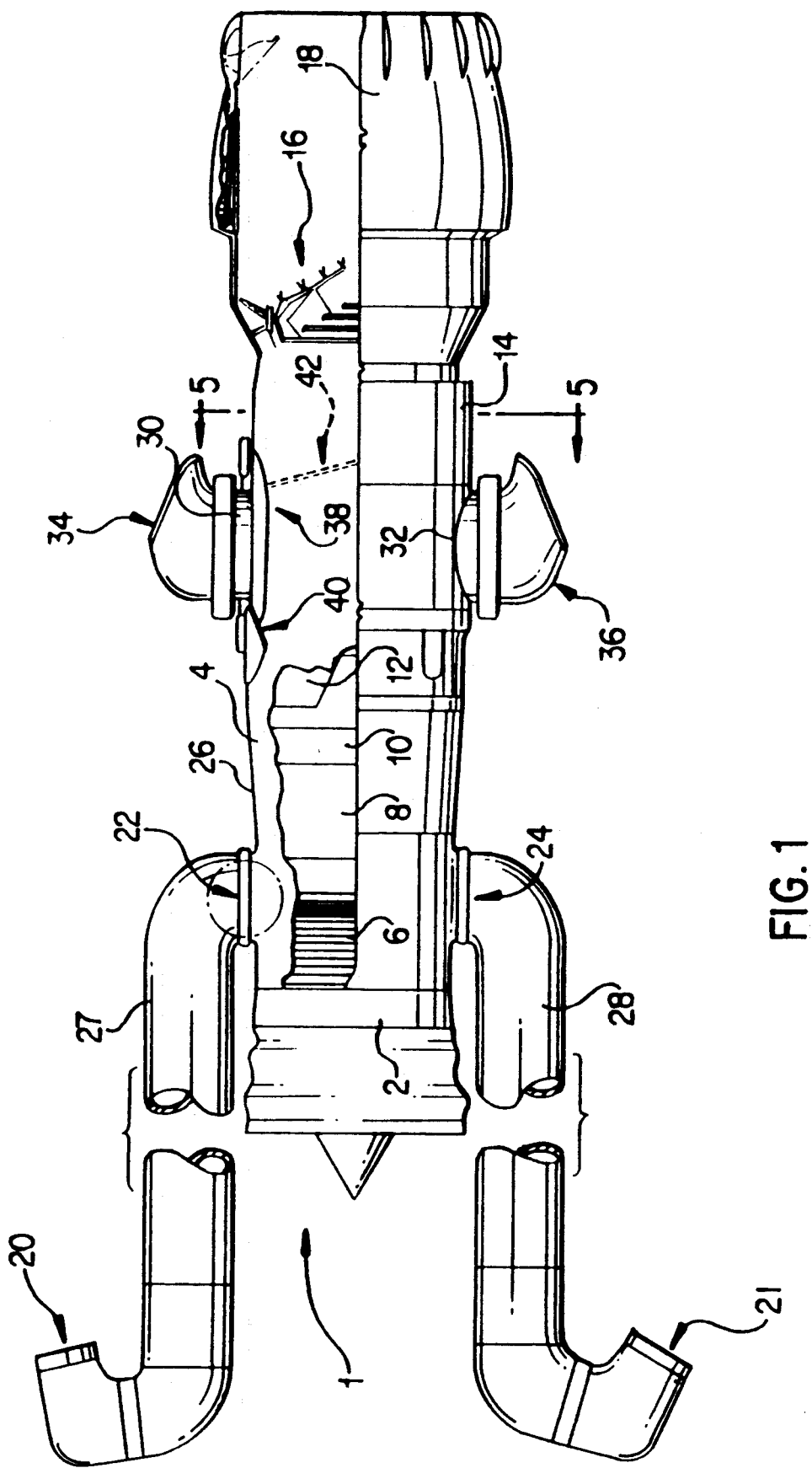
FIG. 1 shows a schematic general assembly of a complete engine of the type referred to, sectioned above the centre line to reveal relevant internal detail.

Referring first to FIG. 1 a basic layout of an engine having selectively alternative side discharge and axial discharge nozzles is shown in part cut-away form. The engine is cut-away above the centre line, to reveal internal features such as the location of the side outlets and the diverter valve means.

The engine has an air intake 1, a front fan at 2, and leading from the rear face thereof an annular by-pass duct 4 surrounding a compressor section 6. Air from the compressor section feeds a combustor section at 8. The hot exhaust from a turbine section at 10 passes through a mixer nozzle 12 into a jet pipe 14. The jet pipe 14 may contain an afterburner system indicated generally at 16. The jet pipe terminates in an axial discharge nozzle 18 in the form of a variable area propulsion nozzle.

In the drawing nozzle 18 is shown as being of a conventional axisymmetric and non-vectoring type. Other types of nozzle including vectoring may be employed.

The engine is provided with valve means for selectively diverting cold air from the by-pass duct and hot gas from the core turbine. Towards the front part of the by-pass duct 4 there is provided side outlet means 22,24 through which cold by-pass air may be selectively diverted to vertical lift nozzle means 20,21. The particular embodiment illustrated has two side outlet ports on opposite, ie port and starboard, sides of the engine by-pass duct. Each outlet port 22,24 communicates via respective ducts 27,28 with separate lift nozzles 20,21. In an alternative embodiment (not shown) there may be one by-pass air side outlet means and one vertical lift cold air nozzle.

In practice, there are a number of possibilities for combinations of outlet ports and lift nozzles, vectorable or otherwise, according to airframe requirements. Also the outlet ports could supply by-pass air directly to the lift nozzles as described in U.S. Pat. No. 3,280,560 and similar to the arrangement found in the Rolls-Royce PEGASUS engine, thus dispensing with the ducts leading to more remotely positioned nozzles. Airflow through the by-pass air side outlet means 22,24 is controlled by means of valves located in the by-pass duct wall. One of these valves is indicated by dashed line 22 in the sectioned part of FIG. 1 in the upper half of the drawing. The valve illustrated is a "butterfly" type of valve, but other forms of valve may serve equally as well. For example the shuttle type of valve described in U.S. Pat. No. 3,280,560. However, this is not directly concerned with the subject matter of the invention to be described herein.

Side outlet means is provided at 30,32 for hot turbine exhaust gas diverted from the jet pipe 14. In the particular embodiment illustrated port and starboard side outlet ports 30,32 are formed in the walls of jet pipe on opposite sides thereof and towards its upstream end. Ports 30,32 lead directly into port and starboard vectoring nozzles 34,36 on opposite sides of the engine. Adjacent the side outlet means there is provided diverter valve means generally indicated at 42, the construction and operation of which is shown in greater detail in FIGS. 2 to 5.

Figure 2:
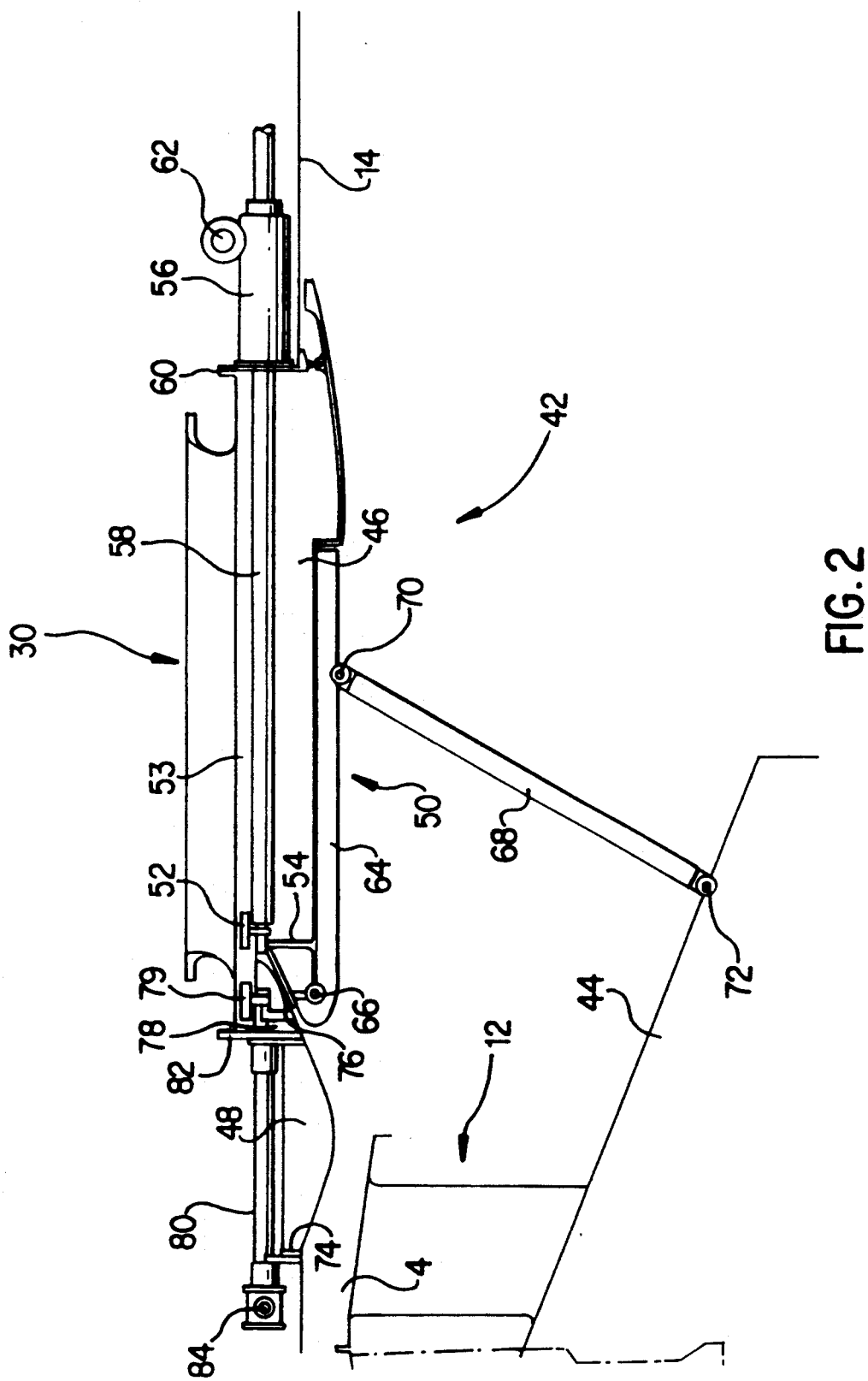
FIG. 2 shows a detailed view of a diverter sleeve valve including a second sleeve valve for delaying the effect of opening the first valve.
Figure 3:
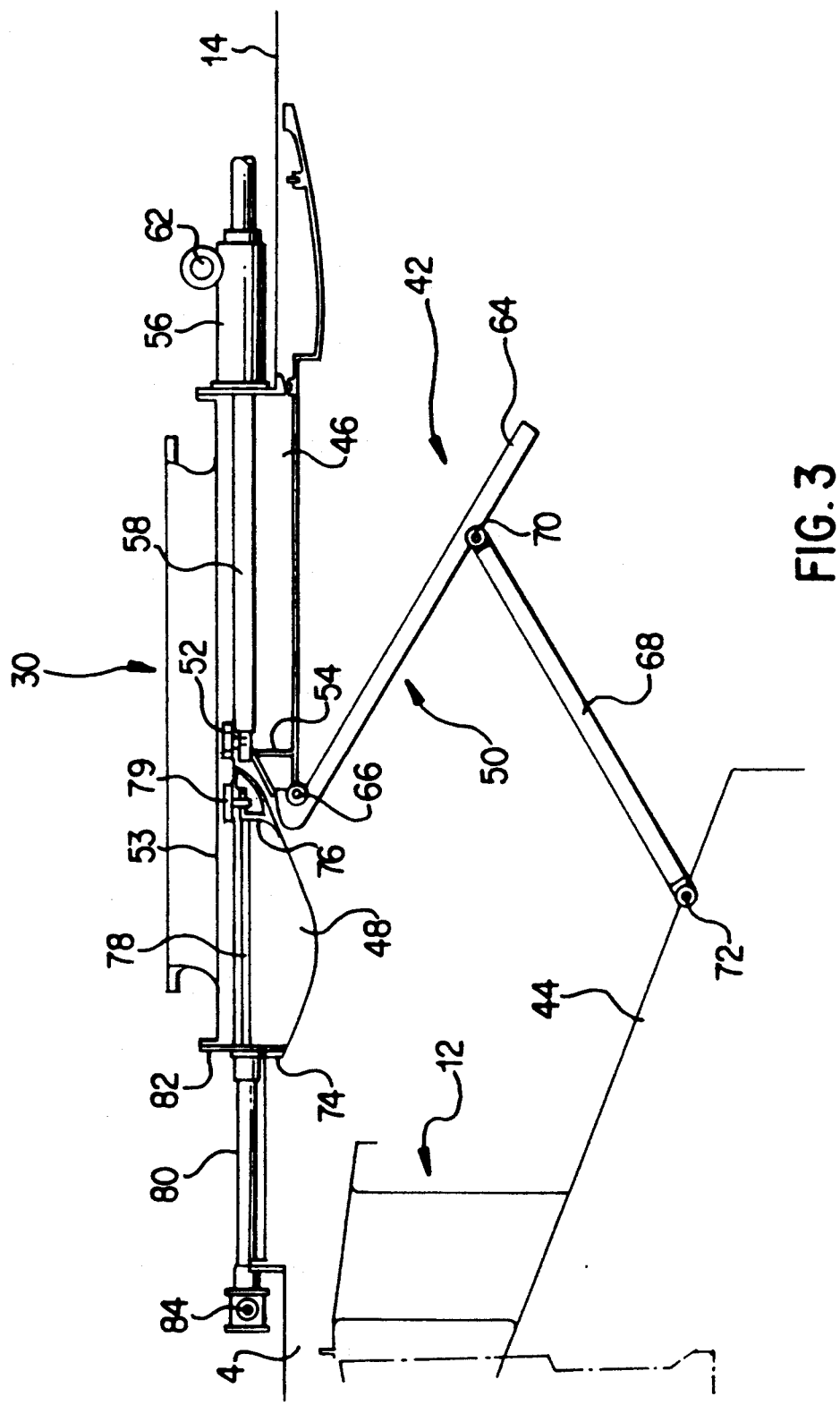
FIG. 3 shows the valve of FIG. 2 in an intermediate position illustrating the method of delaying opening.
Figure 4:
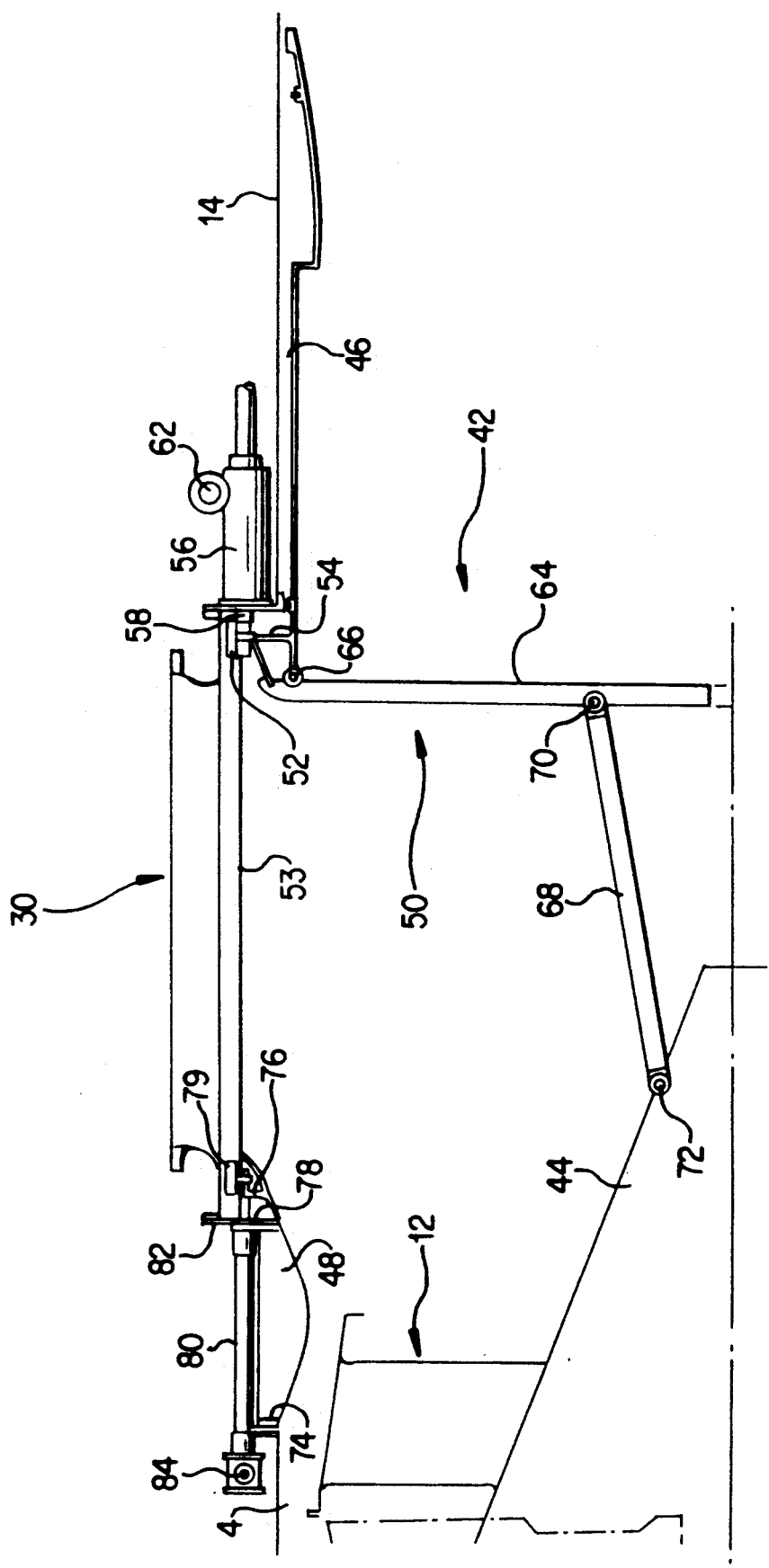
FIG. 4 shows the valve of FIG. 2 in the fully opened position.
Figure 5:
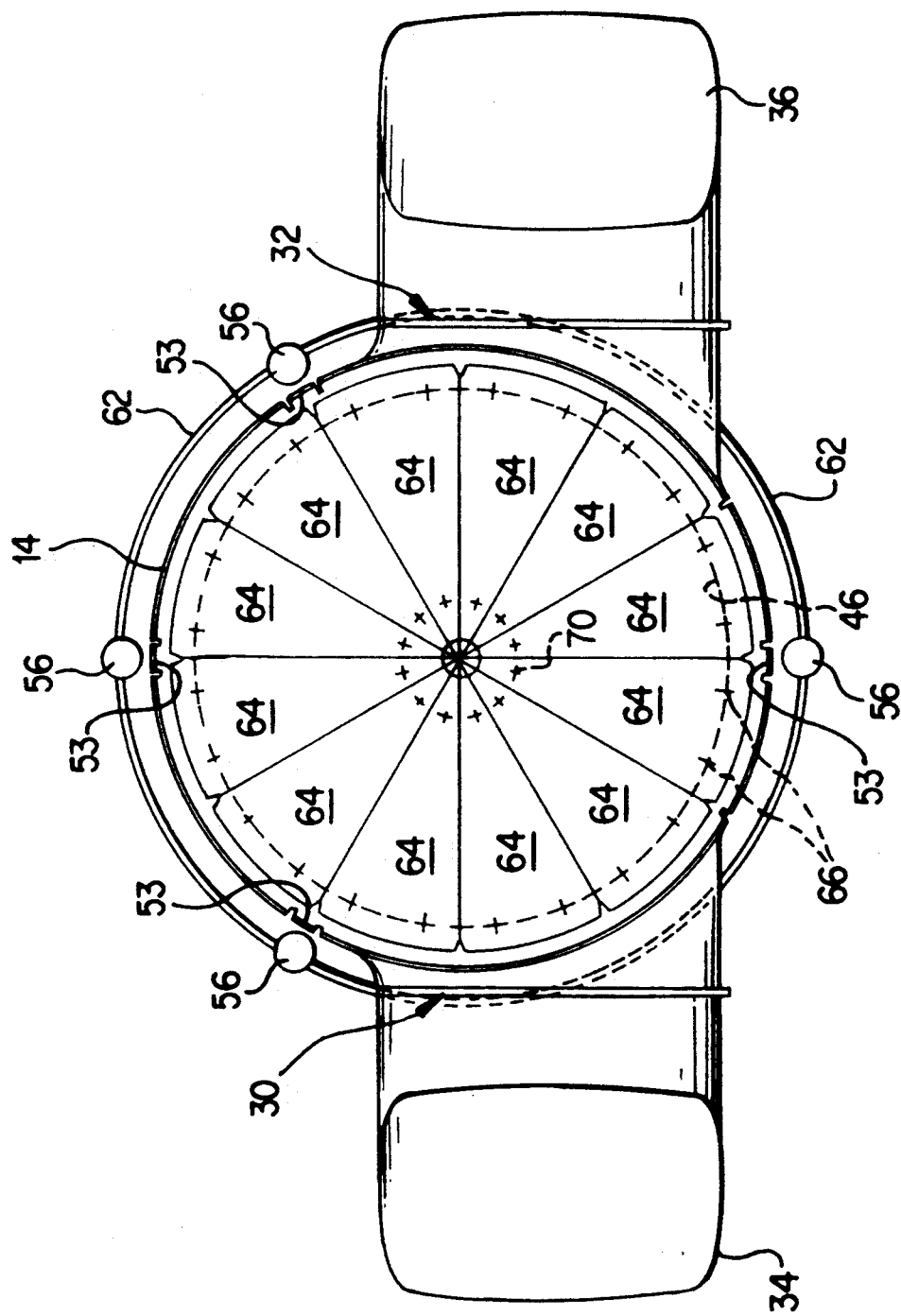
FIG. 5 shows an axial view of the diverter valve on the section 5—5 of FIG. 1 looking rearward along the centre line of the engine with the valve blocking the jet pipe as in FIG. 4.

FIGS. 2 to 4 show the diverter valve means in a transverse half-view along the axis of the engine. FIG. 5 shows an axial view of the blocker portion of the valve together with the side ports and nozzles.

The downstream end of by-pass duct 4, concentric with the turbine exit mixer nozzle 12 together with the jet pipe 14 comprise a fluid flow duct. Fluid, in this case exhaust gas, or a mixture of exhaust gas and by-pass air, enters the upstream end of the duct and exits through alternatively selectable outlets. That is, either through the side outlets 30,32 and associated nozzles 34,36 or through the jet pipe 14 and axial discharge nozzle 18.

Towards the left of the FIGS. 2 to 4 the downstream end of the by-pass duct is shown at 4, and concentric therewith mixer nozzle 12 through which hot turbine exhaust flow exits the core engine. The radially inner flow boundary of nozzle 12 is defined by the tapering wall of exhaust cone 44 which projects rearwardly toward the upstream end of the jet pipe. The adjacent end of the jet pipe is drawn at 14. One of the ports of the side outlet means is shown at 30.

The ports 30,32 are defined by the intersection of two cylinders of different diameters, their axes disposed at right angles but displaced by less than one radius. This is visualised in the axial view of FIG. 5.

The diverter valve means 42 comprises dual sleeve valves 46,48 and a segmented blocker valve 50. The main sleeve 46 covers the side outlet ports 30,32 in the axial thrust cruise configuration as shown in FIG. 2. Also, the blocker valve is completely stowed. In FIG. 4 sleeve valve 46 has been translated rearwards (to the right in the drawing) to uncover the side ports 30,32 and the blocker valve 50 deployed to obstruct axial flow downstream of turbine mixer nozzle 12. At these two extreme valve positions sleeve valve 48 plays no effective role and occupies a stowed position against the outer wall of the flow path. However, FIG. 3 shows an intermediate valve position in which valve 48 acts as a shuttle valve to follow main sleeve valve 46 in order to delay the effect of its opening.

The valve 46 comprises an annular sleeve lying adjacent the inner surface of the jet pipe wall 14. The axial length of the sleeve 46 is sufficient to cover the side outlet ports 30,32. The sleeve is supported by means of four guide rollers 52 equally spaced around the jet pipe which run in axial tracks 53 spaced apart circumferentially around the jet pipe adjacent the side outlet ports 30,32. The forward margin of the sleeve includes stiffening means in the form of annular structure 54. A plurality of actuators, of which one is shown at 56, are mounted on the exterior of the jet pipe and spaced apart circumferentially to distribute actuation loads evenly. Each actuator has an output member 58 attached at its distal end to the annular stiffener 54.

Figure 6:
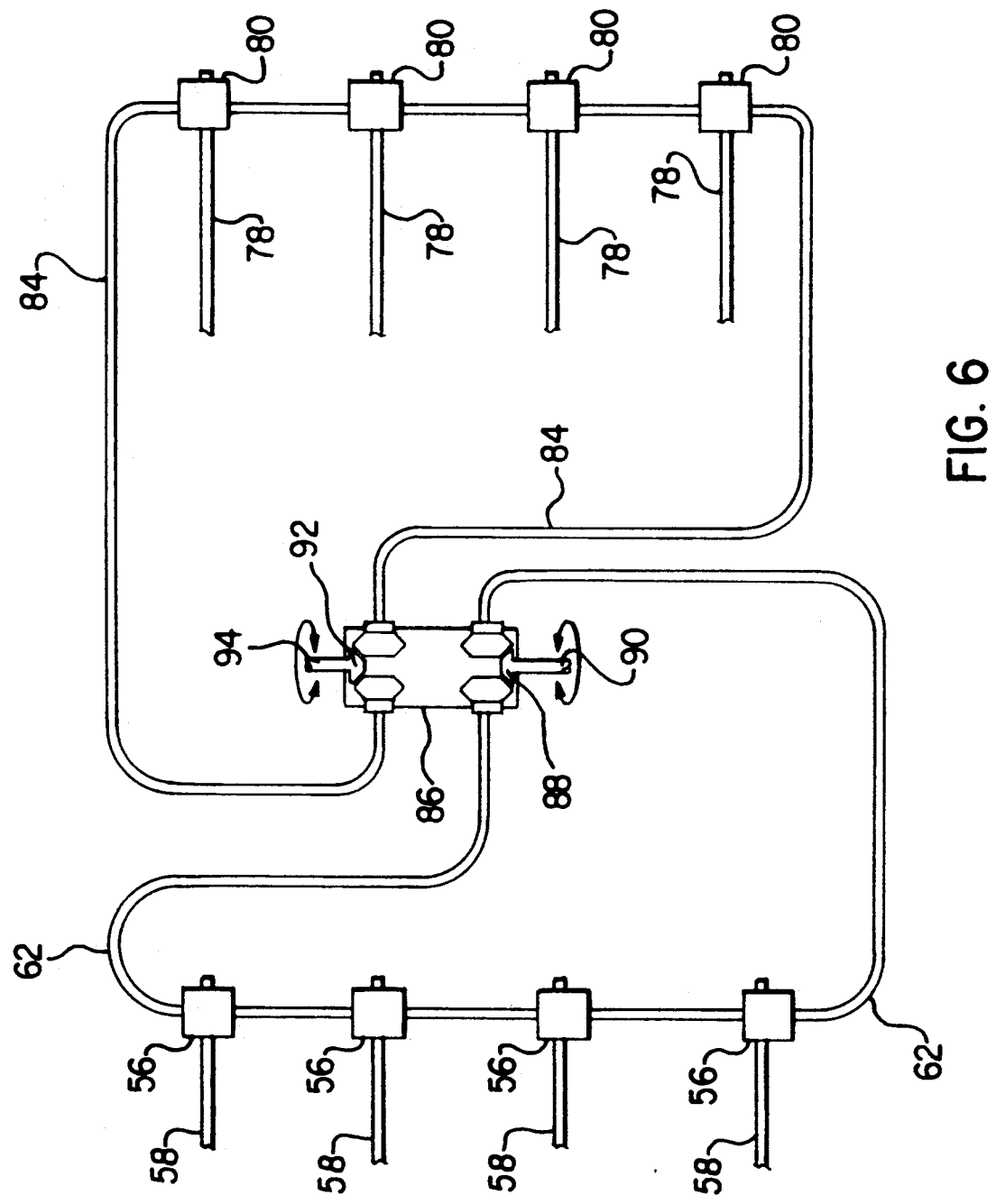
FIG. 6 shows in a schematic form an actuator arrangement for synchronised operation of the diverter and second sleeve valves.

In the illustrated example four actuators 56 are equidistantly spaced around the jet pipe mounted on a support flange 60 which encircles the jet pipe just aft of the outlet ports 30,32. The actuators are of the recirculating ballscrew type. They may be operated individually, but in synchronism, to translate the sleeve 46. Preferably, however, all of the actuators are operated in unison by a common torsional rotating cable type drive 62 which encircles the jet pipe interconnecting the actuators 56. As shown in FIG. 6, the two ends of drive cable 62 are both driven, for redundancy, from a common gearbox 86. Each cable end is coupled to a bevel gear and both gears are driven by pinion 88 on a first input drive shaft 90. The drive is reversible.

The blocker portion 50 of the diverter valve comprises a multiplicity of segmented leaves 64 which deploy into a circular array transverse to the jet pipe axis, as illustrated in FIG. 5. Each leaf segment 64 is pivoted at 66 towards its wider end to the upstream end of the main sleeve valve 46. The fixed length link 68 is pivotally attached between a point 70 on the leaf and a point 72 on the turbine exhaust cone 44. The length of links 68 is chosen so that when the sleeve 46 is forward, as in FIG. 2, the leaves 64 are made to lie flat against the inner face of the sleeve. The surface of the sleeve 46 is sculpted to receive the leaves whereby to form a smooth flush surface to the gas stream.

In operation, as the sleeve 46 is translated rearwards, by energisation of ballscrew actuators 56, the outer or wider edges of the blocker leaves moves along a linear path close to the jet pipe wall. Meanwhile, the fixed length links 68 restrain the inner or narrower ends of the block leaves 64 to follow a fixed radius curve about points, such as 72, close to the jet pipe axis. The resulting compound motion results in the leaves 64 being deployed from the position in which they effectively form the exhaust duct wall; through the intermediate position of FIG. 3; and into the fully deployed position of FIG. 4 in which the leaves co-operate in a circular array to substantially obstruct the exhaust duct.

The action of initially uncovering the side outlets 34,36 by sleeve valve 46 is not evenly balanced by the initial effect of deploying the blocking segments 64. The former effect is much greater than the latter. The converse also holds when the sleeve valve 46 is returned towards the position it has in FIG. 2. In both instances the pressure drop experienced across the turbine stages immediately upstream of the ports is too great and may give rise to a mismatch because of overspeeding of the LP (low pressure) system leading to fan flutter or engine malfunction. The present invention is intended to remedy this drawback by providing the second sleeve, or shuttle, valve 48.

The shuttle valve 48 comprises a short annular sleeve disposed upstream of the main sleeve valve 46. The sleeve is formed of sheet material with an annular stiffening flange 74 at its upstream side. The sleeve 48 is carried at its opposite, downstream end by an annular structure 76 to which a plurality of actuator rods 78 are connected. Circumferential loads on the sleeve are reacted by a plurality of guide rollers 79 carried on structure -6 which engage tracks 53 spaced apart around the circumference of the jet pipe. Actuation is by means of three or more lightly loaded, recirculating ballscrew actuators 80 equi-distantly spaced apart around the jet pipe. The ballscrew threads have a steep helix angle such that they are reversible. The actuators are synchronized by means of an interconnecting flexible drive in the form of a second torsional rotating cable 84, see FIG. 6. As before, for redundancy, both ends of cable 84 are coupled to bevel gears and driven by a second pinion 92 carried by a second input shaft 94 in gearbox 86. This second drive is also reversible independently of the first drive. The actuators 80 are mounted on an annular stiffening ring 82 which encircles the engine casing on the upstream side of outlet ports 30,32.

The shuttle is normally parked at the end of the by-pass duct adjacent the upstream edges of the side outlet ports. When the main sleeve valve 46 is in position covering the side outlet ports 30,32 its upstream margin abuts the downstream margin of the shuttle valve 48. Sealing means may be provided between the confronting surfaces of the two sleeve valves to eliminate leakage into the side outlet ports 30,32 when they are covered.

The above mentioned drawback of area-mismatching is avoided by the use of the shuttle valve 48. When the main sleeve valve 46 commences to open the shuttle valve 48 is moved aft at the same rate. At a predetermined point in the rearward translation of the two valves the shuttle valve hits flange 82 which doubles as a stop. Means, for example a clutch, is arranged to disconnect drive to the cable 84 when the suttle valve reaches this stop. Preferably input shaft 94 is disconnected from its prime mover. With positive drive discontinued exhaust gas pressure acting on the exposed surfaces of the shuttle valve force it back to its initial position. A suitable buffer stop may be provided to arrest the shuttle and to absorb shock loads.

The maximum excursion of the shuttle valve is illustrated in FIG. 3. At the limit of its deployment it extends across about one third of the side ports. Up to that point the shuttle valve has, in effect, maintained the side outlet ports completely covered. Meanwhile, the blocker valve leaves 64 have deployed almost half-way and have significantly reduced the flow duct cross sectional area.

The shuttle valve 48 is normally parked in the position shown in FIGS. 2 and 4, that is at the downstream end of by-pass duct 4. This location is a major influence on the shape chosen for the inner surface of the shuttle. The shape of this surface is determined by the aerodynamics required at the by-pass duct exit. The downstream side of the shuttle surface is curved outwards, at least in the region of the side outlet ports 34,36 whereby to provide a smooth turning surface to airflow entering the ports with the diverter valve in the position illustrated in FIG. 4.

In operation, therefore, the shuttle valve effectively delays opening of the side outlet ports in order to avoid the over-area mismatch problem. The delay is operative until the blocker portion of the diverter valve has deployed sufficiently to begin to restrict significantly the area of the axial flow duct. After that point the main and shuttle sleeve valves move apart to open the side outlet ports and the blocker valve fully closes the axial jet pipe. The hot gas stream is thereby diverted from the axial nozzle to the side ports effecting a transition from horizontal to vertical thrust. The shuttle valve 48 is returned fully to its parked position when the main valve 46 has traversed about two-thirds of the distance across the side ports.

A corresponding sequence of valve movements is also followed in reverse operations. Thus, commencing with the valves in the positions shown in FIG. 4 the sleeve valve 46 begins to move forward, in an upstream direction, to begin covering side ports 30,32. The movement of the sleeve valve also break-open the blocker valve leaves 64 to allow resumption of axial gas flow. The leaves 64 act somewhat like a stopped-down convergent exhaust nozzle wherein back-pressure is relieved by flow through the side outlet ports 30,32. When sleeve valve 46 reaches about one-third across the side ports the shuttle valve 48 is deployed away from its parked position towards the main sleeve 46. The two sleeve valves 46,48 meet when the main valve 46 is about two-thirds across the side ports thereby fully closing them. Movement of the shuttle valve 48 is then reversed in direction and it travels back to its initial position maintaining sealing contact with the main valve 46. Meanwhile, the blocker valve leave 64 are returned, by the combined action of the linear movement of sleeve 46 and arcuate movement of link 68, to lie flush against the inner surface of the sleeve valve.

The scope of the invention is defined by the appended claims. Although the invention has been described with particular reference to a diverter valve for selectively directing hot exhaust gas from a gas turbine engine, the invention may find application in other fluid flow arrangements.

I claim:

1. A fluid flow duct arrangement comprising:
a generally cylindrical wall having an upstream end defining a flow entry, a downstream end defining a first flow exit, and formed between said upstream and downstream ends at least one side aperture defining a second flow exit;
first valve means disposed within the duct for selective deployment to obstruct the first flow exit;
axially translatable second valve means comprising an upstream sleeve valve member and a downstream sleeve valve member arranged for selective deployment to block or to uncover the second flow exit; and
the first valve means and the second valve means being arranged for movement in synchronism to open and block said exits alternatively;
wherein the upstream and downstream axially translatable sleeve valve members co-operate to uncover and block the second flow exit in a staged movement to maintain substantially constant pressure in the duct.

2. The fluid flow duct arrangement of claim 1, wherein:
the upstream sleeve valve member has a downstream face and the downstream sleeve valve member has an upstream face which abut when the sleeve valve members are together.

3. The fluid flow duct arrangement of claim 1, further comprising:
first actuation means energisable to deploy the downstream sleeve valve member, and second actuator means energisable to independently deploy the upstream sleeve valve member.

4. The fluid flow duct arrangement of claim 1, wherein the first valve means comprises:
a plurality of segments each having a first end pivotably connected to the second valve means and a second end opposite the first end restrained for arcuate movement about a fixed point whereby axial movement of the second valve means causes the first valve means to deploy to obstruct the first flow exit.

5. The fluid flow duct arrangement of claim 1 wherein:
in a first valve position a first of said two sleeve valve members is arranged to block the side flow exit, and
in a second valve position neither of the two sleeve valve members obstructs the side flow exit.

6. The fluid flow duct arrangement of claim 5, wherein:
in intermediate valve positions moving from said first valve position to said second valve position the two axially movable sleeve valve members co-operate to delay opening of the side flow exit.

7. The fluid flow duct arrangement of claim 6, wherein:
during reverse valve operation the two sleeve valve members co-operate to advance closing of the side flow exit.

8. An aircraft power plant comprising:
a gas turbine engine;
a jet pipe for receiving exhaust gas from the engine;
axial discharge nozzle means at a downstream end of the jet pipe for discharging exhaust gas therefrom;
side outlet means towards an upstream end of the jet pipe communicating with alternative discharge nozzle means;
first valve means disposed within the upstream end of the jet pipe for selective deployment to block exhaust flow through the jet pipe; and
axially translatable second valve means comprising an upstream sleeve valve member and a downstream sleeve valve member arranged for selective deployment to block or uncover the side outlet means;
wherein the upstream and downstream axially translatable sleeve valve members co-operate to uncover and block the side flow exit in a staged movement to maintain substantially constant pressure in the flow from the gas turbine engine.

9. The aircraft power plant of claim 8, wherein the first valve means comprises:
a plurality of segments each having a first end pivotably connected to the second valve means and a second end opposite the first end restrained for arcuate movement about a fixed point whereby axial movement of the second valve means to uncover the side outlet means causes the segments of the first valve means to deploy to obstruct axial flow through the jet pipe.

10. The aircraft power plant of claim 8, wherein the upstream and downstream sleeve valve members for blocking and unblocking the side outlet means
are mounted for co-axial movement relative to the jet pipe.

11. The aircraft power plant of claim 10, wherein the upstream and downstream sleeve valve members comprise:
a first sleeve valve member movable axially between a first position to block the side outlet means and a second position to unblock the side outlet means; and
a second sleeve valve member movable independently relative to the first sleeve valve member wherein:
said first and second sleeve valve members co-operate to uncover and block the side flow exit in a staged movement to maintain the total open flow exit area substantially constant.

12. The aircraft power plant of claim 8, wherein:
in a first valve position the downstream sleeve valve member is arranged to block the side flow exit, and
the downstream sleeve valve member is movable axially in a downstream direction to a second valve position in which neither of the sleeve valve members obstructs the side flow exit.

13. The aircraft power plant of claim 12, wherein:
in use, the upstream and downstream sleeve valve members co-operate to define valve positions intermediate the first and second valve positions which delay opening of the side flow exit or in reverse operation advance closing of the side flow exit.

* * * * *